Feb. 20, 1968        D. J. PETERSEN        3,369,929

PLASTER ON METAL APPLICATION

Filed Sept. 21, 1962

*INVENTOR.*
Donald J. Petersen
BY
*Robert F. Hause*
ATTORNEY 3,369,929
PLASTER ON METAL APPLICATION
Donald J. Petersen, North Tonawanda, N.Y., assignor to National Gypsum Company, Buffalo, N.Y., a corporation of Delaware
Continuation-in-part of application Ser. No. 17,526, Mar. 25, 1960. This application Sept. 21, 1962, Ser. No. 226,481
4 Claims. (Cl. 117—127)

This application is a continuation-in-part of my application Ser. No. 17,526, filed Mar. 25, 1960, now abandoned.

The present invention relates to the application of a gypsum plaster composition on a metallic structural base, and is particularly directed to a plaster composition for spray-on application to a metal base.

A relatively thick coating of inorganic material over metallic structural elements is commonly required for providing fire-retardance, improving appearance, deadening noises, and other reasons. Previously known methods of providing such coatings consist of applying a plurality of separate relatively thin coats of a basically argillaceous, non-settable, mixture and allowing for drying between each such coat, obviously a slow and costly method for forming the desired, relatively thick, resultant coating. Such compositions, containing a large percentage of this clayey material, are well known to shrink considerably and crack during drying. These cracks are not only unsightly, but, as will be readily appreciated, considerably lower the fire resistance of the structure, because the cracks allow direct access of the heat to the metal structural members. This would also be the case, were a highly porous inorganic composition applied to the metal substrate.

Coatings of this porous type, for example, have a low density, of about 15–25 pounds per cubic foot, and contain a multiplicity of openings, interconnecting voids, or ruptured cells, which are used as cavities to absorb sound; these are general features of what are known in the trade as acoustical plasters. Such plasters may be said to afford a certain degree of heat insulation, loosely speaking, but they are known to afford poor insulation against the effects of high temperatures, such as those which are encountered in fires.

Normal higher density plasters are also known to be spray-applicable, but the presence of a high-density aggregate, such as sand, is known to provide comparatively poor fire resistance, as contrasted with a lightweight (low density) plaster which is still free from substantially all voids other than those interior to the expanded aggregate. Such higher density plasters are generally known as base coat, or ordinary structural, plasters, and they have densities varying from about 45 p.c.f. up, depending on the proportion of sand to lightweight aggregate present. This low density aggregate is known in the art, and sometimes referred to herein, as "lightweight aggregate" and comprises perlite, vermiculite, lightweight ("popcorn") slag, and the like, and has a density of less than 15 p.c.f. and generally 7–9 p.c.f.

Accordingly, it is an object of the present invention to provide a novel method of applying an inorganic, thick, fire-retardant coating over metal wherein the entire thickness can be applied in a single operation.

It is a further object of the invention to provide such a novel method wherein shrinkage is sufficiently minimized to avoid substantially all application shrinkage cracks.

It is a further object of the invention to provide such a method wherein a strong bond of the coating to metal is provided without special preparation of the metal, either chemical preparation, as with an adhesive, or mechanical preparation, such as by perforating the substrate.

It is a still further object to provide such a method wherein a sprayable consistency mixture may be easily and readily applied resulting in an applied coating of relatively low water content for more rapid drying.

It is a still further object to provide a novel composition of a settable, calcined gypsum base, adaptable to the improved method, and which results in an improved, strong, set, fire-retardant coating.

It is a still further object of the invention to provide an improved floor-ceiling structure with metallic core elements having the novel gypsum fire-retardant coating disposed throughout the underside thereof.

These and other objects of the invention will be more readily apparent when considered in relation to the preferred embodiments as set forth in the specification and shown in the drawings in which.

Figure 1:
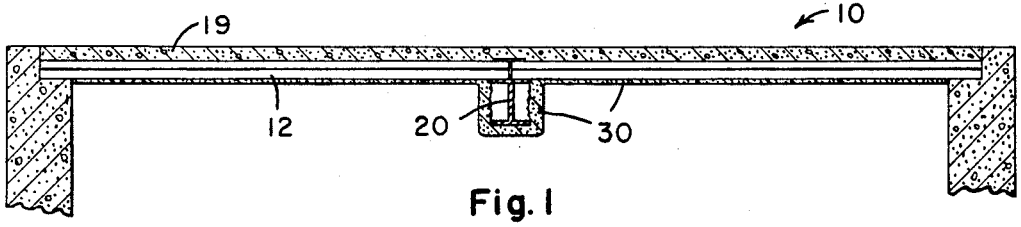
FIG. 1 is a vertical sectional view of a floor-ceiling structure constructed in accordance with the invention.

Referring now to the drawings, there is shown a floor-ceiling structure 10 having in the preferred form a central, imperforate metal core element 12 formed of two, oppositely disposed, corrugated metal sheets 14 affixed together to form elongate hollow cells 16. A narrow, sheet metal cap 18 conforming to the shape of elements 12 extends along and over the joints of the elements 12. On the upper face of the elements 12, a poured and set concrete floor 19, with a minimum thickness of about 2½ inches, is disposed throughout the extent of the structure 10.

Supporting the floor-ceiling structure 10 is a steel I-beam or wide-flange beam 20, for example, a standard 24 pound per foot, 8 inch, wide flange beam. The beam 20 is enclosed on the bottom and two sides with standard ⅜ inch, self-furring, diamond mesh expanded metal lath 22 affixed to the ends of the beam flanges with beam furring clips 24.

The above described portions of the floor-ceiling structure 10 are known, available floor-ceiling elements, the present invention lying in the combination therewith of the novel, settable, gypsum plaster, fire-retardant, sprayed-on coating described herebelow. It will be accordingly understood that the floor-ceiling elements may be of a cellular design, having a variety of cell shapes, or may be corrugated, fluted, or otherwise designed to afford stiffness in bending.

Disposed throughout the lower surface of the floor-ceiling structure 10, including all exposed surfaces thereunder such as the sides and bottom of beam 20, is a coating or layer of a novel, fire-retardant set gypsum plaster 30, bonded directly to the untreated metal surfaces of the metal sheets 14 and of the expanded metal lath 22 covering the beam 20. This coating or layer is of a minimum thickness of about ⅜ inch to ¾ inch on the sheets 14 and of about 2 to 2½ inches on the metal lath 22.

Figures 4, 5:
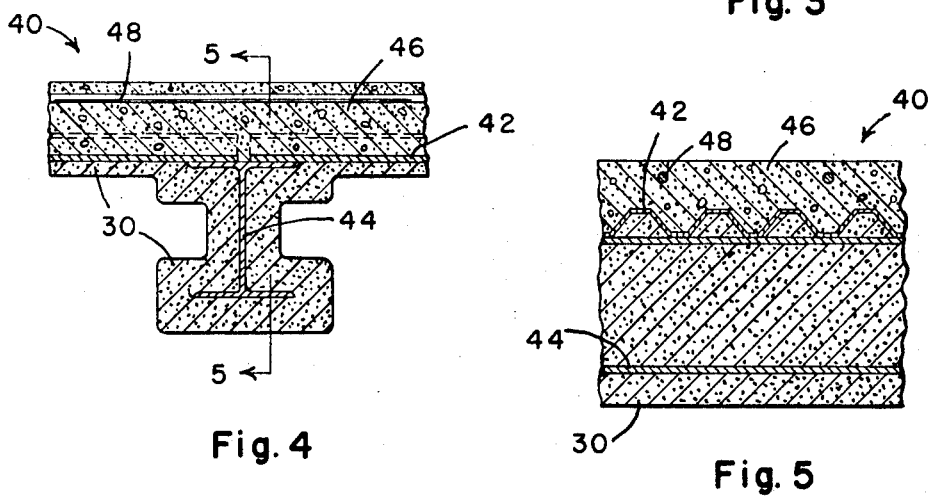
FIG. 4 is a sectional view similar to FIG. 2 of a modified form of the invention.
FIG. 5 is a sectional view of the structure of FIG. 4 taken on line 5—5.

In a modified form of the invention shown in FIGS. 4 and 5, a floor-ceiling structure 40 is shown, including a metal core element 42 which is a single corrugated metal sheet, mounted on an I beam with a poured and set concrete floor 46 disposed atop the elements 42. Reinforcing rods 48 are shown disposed within the set concrete floor 46. A coating of the novel fire-retardant set gypsum plaster 30 is bonded directly to the untreated under surface of the metal core element 42 to a thickness of about ⅜ to ¾ inch and directly to all exposed surfaces of the I beam 44.

This modification shows the alternative of eliminating the metal lath and applying the novel fire-retardant coating 30 directly to the untreated metal beam surfaces, in thicknesses of about 2 to 2½ inches. It will be understood that whereas the use of an expanded metal lath section as shown at 22 may provide a saving of materials, and such expanded metal lath will readily accommodate the plaster composition of the present invention, that its use to secure a metal-to-plaster bond is unnecessary to the present invention. In fact, a principal advantage of the present invention is that this expanded metal, previously thought ncessary to secure a bond in conjunction with a sprayed-on material, is completely unnecessary to the practice of the invention, because the composition is capable of excellent self-bonding to an imperforate, untreated metal substrate. It was previously thought that a composition fluid enough to be transported and sprayed in this density would lack the necessary adhesion to substrates of this type.

Therefore, the settable, substantially non-shrinking, gypsum plaster, fire-retardant coatings have been found to provide a markedly improved structure, in appearance, fire-retardancy, ease of application and cost, over the previously employed non-setting inorganic coating materials, particularly clays applied in aqueous slurries, employed for the same purpose.

*Example I*

A settable gypsum plaster composition in accordance with the invention is provided by the following formulation:

| | Lbs. | Percent by weight |
|---|---|---|
| Calcined gypsum (with set retarder) | 100 | 53 |
| Expanded perlite aggregate (8 lbs./cu. ft.) | 64 | 33.75 |
| Asbestos fiber | 25 | 13.2 |
| Sulfated monoglyceride foaming agent | 0.08 | 0.05 |

The formulation of Example I is thoroughly admixed with 180 pounds of water and sufficiently agitated, or otherwise aerated, to increase the bulk volume by about 50% to 100%. The resultant foamed mixture is then pumped through spray-application apparatus and spray-applied directly to untreated metal surfaces which are sought to be coated.

It will be understood that the addition of a foaming or air-entraining agent of this type, such as "Monad G" (a product of the Colgate Company), is a conventional method of entraining air to render the mix transportable to a point adjacent the point of application by means of spraying. Unlike the spraying of acoustical plasters, however, the spraying of the plaster of the present invention occurs in a manner such that the entrained air is substantially removed immediately upon, or shortly after, discharge from the spray nozzle. Thus, although during mixing and transport, the mix has a comparatively low density, it reverts to a higher density upon discharge from the nozzle, and subsequent to this application, then dries out again to a lower density. The volume is ordinarily thus temporarily increased from about 50% to 100% of its original volume.

In the dry state, before initial mixing with water, the composition has a density of about 17 to 21 p.c.f. The addition of water raised this density to about 58 to 64 p.c.f.; incorporating the air-entraining agent lowers the density to about 30 to 40 p.c.f.; it is spray applied at the deaerated wet density of 58 to 64 p.c.f., and ultimately dries to a density of from about 25 p.c.f. to about 35 p.c.f.

This novel fire-retardant plaster can thus be seen to possess a density in a range between the very light acoustical plasters and the much heavier structural or base coat plasters After a comparatively complete study of the phenomena which take place during the application of intense heat, as in a fire, to fire retardant coated metal structures, some further conclusions were made.

It is desirable, for example, to maintain a relatively low density for the plaster composition as a whole; this is most easily accomplished by the use of expanded aggregates such as perlite or vermiculite. It is further desirable to afford means of binding the composition together so that it maintains a fairly high integrity; this is accomplished by the use of the asbestos or other inorganic, fibrous mineral material. However, and this is true especially in the case of flat decks and those which will be exposed to high temperatures for long periods, say of the order of four or more hours, excessive cohesion of the plaster can also have detrimental effects. Flat decks, under the stresses imposed by great heat, undergo deformation which tends to separate large pieces of an excessively rigid and cohesive fire-retardant composition from the deck. Therefore, a certain very minor proportion of cracking and fissuring is necessary to best allow for this expansion. Although it will be appreciated that this fissuring and cracking takes place only after several hours of exposure to flames, for example, the cracking does allow enough stress-relieving to keep the material in place for a significantly longer time than would otherwise be possible.

Applicant has discovered that somewhat better adhesion to the metal substrate and somewhat less cohesion and rigidity is made possible by the addition of a minor proportion of a water-swellable clay such as a bentonite type clay, as can be seen in Example II, below.

*Example II*

| | Percent by weight |
|---|---|
| Calcined gypsum (including set retarder), 100 lbs. | 51.8 |
| Expanded lightweight aggregate (perlite), 40 lbs. | 20.68 |
| Asbestos fibers, 50 lbs. | 25.89 |
| Bentonite, 3 lbs. | 1.55 |
| Foaming agent, 0.15 lb. | 0.08 |

A composition as in Example II provides better high temperature resistance especially when applied to flat decks which undergo unsual buckling when exposed to extreme temperatures. The additional asbestos likewise aids in fire-retardance. It will be appreciated that the perlite of either example can be replaced by lightweight slag, vermiculite and the like.

The calcined gypsum content in both examples is set at 100 pounds and will be seen to amount to about 52% by weight of each formulation. However, the percentage of calcined gypsum in a formulation may be varied from about 45% to 60% in accordance with the invention. The principal variation between the two formulations set forth is in the ratio of perlite aggregate to asbestos fibers, and in the addition of a very small quantity of bentonite clay in Example II. As is shown by the two examples, formulations in accordance with the invention, including 100 pounds of calcined gypsum, can be varied in the other ingredients in the order of from about 40 to about 64 pounds of inorganic lightweight aggregate, from about 25 to about 50 pounds of inorganic fibrous material, sufficient foaming agent to provide an increase in the wet volume, following air entrainment, of about 50% to about 100%, and from no clay to a minor proportion of water-swellable clay.

The spray application of the aerated slurries of the gypsum compositions to metal surfaces may be made in a single, full-thickness application, practical thicknesses contemplated ranging from about ⅜ inch to 2½ inches, as shown in the drawings and discussed above.

Figures 2, 3:
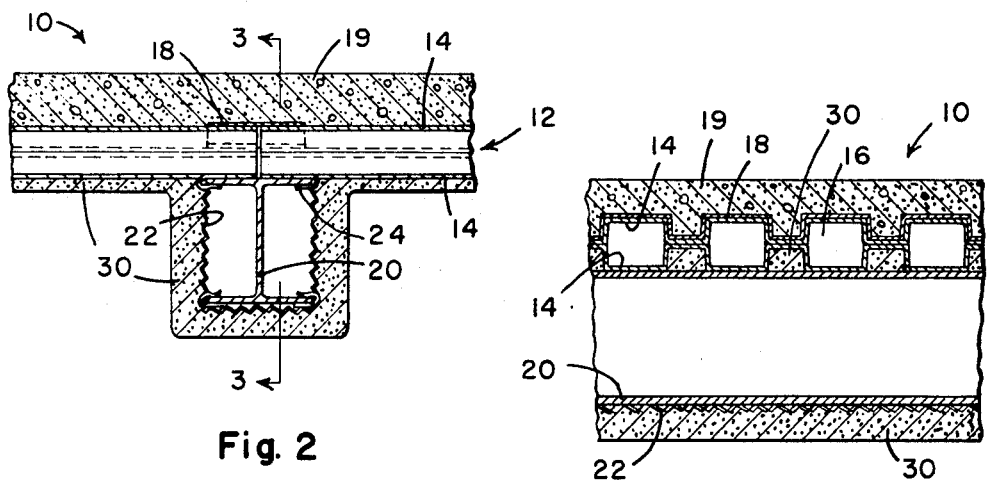
FIG. 2 is an enlarged segment of the view of FIG. 1.
FIG. 3 is a vertical sectional view of the floor-ceiling structure of FIG. 2 taken on line 3—3 thereof.

Fire-retardant classifications, or so-called fire ratings, based on "Conditions of Acceptance" for floor and roofs in the standard for Fire Tests of Building Constructions and Materials, Underwriters' Laboratories 263 (ASTM E 119, NFPA 251), of structures in accordance with the invention have been obtained as follows:

| Structure | Inch Thickness of Coating in Eccordance with the Invention | Amount of Protection |
| --- | --- | --- |
| Floor-Ceiling Structure of Figs. 1-3. | ½ | 4 |
| Do. | ⅜ | 3 |
| Floor-Ceiling Structure of Figs. 4 and 5. | ¾ | 4 |
| I-Beam with Metal Lath as Figs. 1, 3. | 2 | 4 |
| I-Beam without Metal Lath as Figs. 4 and 5. | 2½ | 4 |
| Do. | 2 | 3 |

These formulations provide coatings which are not only simple to apply directly to metal surfaces without the need of treating the metal, either mechanically or chemically, but simultaneously provide for improvements in strength, adhesion to the substrate, freedom from cracks, and fire-retardancy classification. These coating formulations make it possible for the first time to save labor and other costs without sacrificing strength and safety, particularly fire safety, in an extremely common type of building structure, by providing for a combination of strength, ease of erection, durability and improved fire-retardancy ratings.

Having completed a detailed disclosure of the preferred embodiments of my invention so that those skilled in the art may practice the same, I contemplate that variations may be made without departing from the essence of the invention or the scope of the appended claims.

What is claimed is:

1. A settable gypsum plaster composition capable, upon admixture with water, of tenaciously adhering to a substantially imperforate and untreated metal substrate, following spray application thereto, and able to impart greatly improved fire resistance thereto, consisting essentially of 100 pounds of calcined gypsum, from about 40 to about 64 pounds of an inorganic expanded low density aggregate, from about 25 to about 50 pounds of an inorganic, fibrous material, and sufficient foaming agent to provide an increase in the wet volume, following air entrainment, of about 50% to 100%, said calcined gypsum being at least about 45% of said composition.

2. A composition as defined in claim 1 wherein said aggregate is present in an amount of about 64 pounds and said fiber in the amount of about 25 pounds.

3. A composition as defined in claim 1 wherein said aggregate is present in an amount of about 40 pounds, said fiber is present in an amount of about 50 pounds, and wherein there is also up to about 5 pounds of a water-swellable clay.

4. A fire-retardant, set gypsum plaster composition-coated metal structural member comprising a self-bonded coating of the set resultant product of the composition of claim 1, bonded to the surface of an untreated metal structural member.

References Cited

UNITED STATES PATENTS

| | | | |
| --- | --- | --- | --- |
| Re. 23,908 | 12/1954 | Mollo | 106—88 X |
| 2,037,996 | 4/1936 | New | 106—88 |
| 2,602,759 | 7/1952 | Mollo | 106—88 X |
| 2,770,560 | 11/1956 | Nobson | 106—88 X |
| 2,921,862 | 1/1960 | Sucetti | 106—88 |
| 2,993,016 | 7/1961 | Sucetti | 106—88 X |
| 2,526,066 | 10/1950 | Croce | 106—110 |

FOREIGN PATENTS 145,394   2/1952   Australia.

ALFRED L. LEAVITT, *Primary Examiner.*

RICHARD D. NEVIUS, *Examiner.*

A. GOLIAN, J. P. McINTOSH, *Assistant Examiners.*

UNITED STATES PATENT OFFICE
CERTIFICATE OF CORRECTION

Patent No. 3,369,929            February 20, 1968

Donald J. Petersen

It is hereby certified that error appears in the above numbered patent requiring correction and that the said Letters Patent should read as corrected below.

Column 5, in the table, in the heading to the second column, lines 2 and 3 thereof, for "Eccordance" read -- Accordance --; same table, first column, line 7 thereof, for "Figs. 1, 3." read -- Figs. 1-3. --; same table, in the heading to the last column, after "Protection" insert --, hours --.

Signed and sealed this 29th day of April 1969.

(SEAL)
Attest:

Edward M. Fletcher, Jr.            EDWARD J. BRENNER
Attesting Officer                      Commissioner of Patents